E. H. STEELE.
WATER HEATER.
APPLICATION FILED OCT. 13, 1906.
908,512.
Patented Jan. 5, 1909.
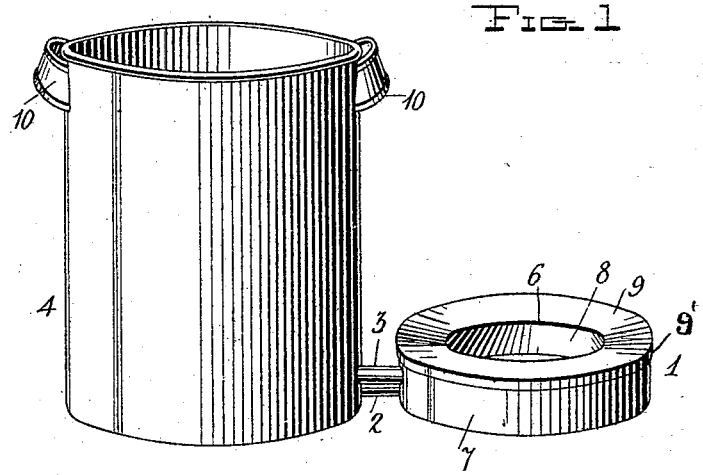
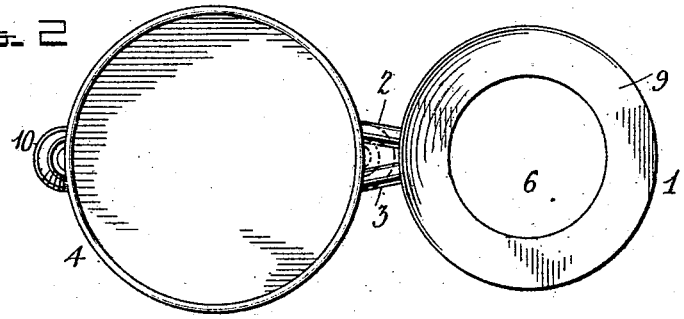
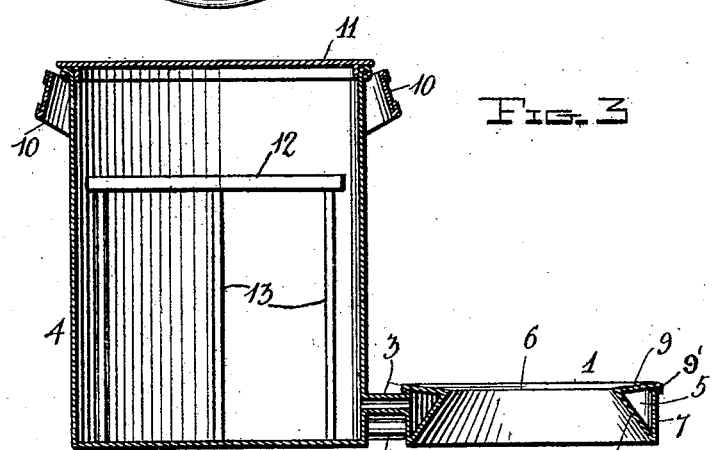
WITNESSES:
INVENTOR
E. H. Steele
BY
Attorney

UNITED STATES PATENT OFFICE.

ELLA H. STEELE, OF LOS ANGELES, CALIFORNIA.

WATER-HEATER.

No. 908,512.  Specification of Letters Patent.  Patented Jan. 5, 1909.

Application filed October 13, 1906. Serial No. 338,782.

*To all whom it may concern:*

Be it known that I, ELLA H. STEELE, a citizen of the United States, residing at Los Angeles, in the county of Los Angeles and State of California, have invented certain new and useful Improvements in Water-Heaters, of which the following is a specification.

My invention relates to improvements in water heaters and more particularly to one in the form of a portable boiler or kettle for use over the burners or pot openings in the tops of stoves and heating devices of all kinds.

The object of my invention is to provide a simple and practical device by means of which water may be heated and food kept warm or steamed by the use of the heat that is ordinarily wasted in cooking on gas, gasolene, oil and other stoves, owing to the spread of the flame by the flat bottom of the cooking utensil and the escape of the heat between the bottom of said utensil and the open support on which it rests.

A further object of my invention is to provide a device of this character which is portable so that it may be placed upon or removed from the top of a stove or heater of any description, and which when set over a burner or pot opening, will not interfere with the use of the same for other heating or cooking purposes.

With the above and other objects in view the invention consists in the novel construction, combination and arrangement of parts hereinafter fully described and claimed, and illustrated in the accompanying drawing in which:—

Figure 1 is a perspective view of my improved portable water heater or boiler with its cover removed; Fig. 2 is a top plan view of the same; and Fig. 3 is a vertical sectional view.

Referring to the drawing by numeral, 1 denotes the body of the heater, which is connected by inlet and outlet pipes 2, 3 to a water or other liquid receptacle or vessel 4. The heater body is rigidly connected to and supported from the vessel or boiler, and both have their bottoms in the same plane so that they may rest upon the flat top of a stove or the like with the heater body over one of the burners or pot openings therein. The body of the heater is hollow to provide a water chamber 5 which surrounds a central opening 6 in said body. The body is also preferably annular in shape and forms a water heating ring which is of substantially triangular shape in cross section, as shown in Fig. 3. In other words the body or ring 1 consists of an upright, annular outer or side wall 7, an upwardly and inwardly inclined annular bottom 8, and a downwardly and inwardly inclined annular top 9 having a surrounding flange 9' secured to the upper edge of the ring. The bottom 8 and top 9 are in the form of two cone frustums united at their small ends with the upper one inverted. The lower one 8 is sufficiently large to entirely cover the burner over which the device is used, and the upper one 9 is adapted to be closed by the bottom of the pot, pan or other utensil placed upon it, so that a chamber is formed beneath the utensil to confine and concentrate the heat from the burner and diffuse it over the entire bottom of the utensil and the inner and upper surface of the ring, thus utilizing it to the fullest extent possible. When the central opening 6 in the heater body is thus closed by the flat bottom of a pot or other vessel, the flames from the burner will be deflected by the part 8 against the center of the bottom of the pot; and as they spread outwardly over the entire surface of the pot bottom they will be directed downwardly and inwardly over the entire upper surface of the part 9 of the heater, the heat and flames being thus confined and directed against the parts to be heated, will be utilized to the fullest extent possible, as previously stated. Owing to the closure of the opening 6 by the bottom of the pot, the flames cannot escape around the edge of the latter between its bottom and the top of the heater, and hence there will be no loss or waste of heat at this point, as is common in devices of this character. This double or twin frusto-conical shape of the bottom and top of the heater provides a greater heating surface for the body of the heater itself and also causes the heat and flames from the burner to spread to every portion of the bottom of the pan or other vessel supported upon the top of the heater. The use of the heater over a burner therefore, does not interfere with the use of the burner for another purpose, but rather renders it more effective and utilizes the heat that is ordinarily wasted owing to the spread of the flames by the flat bottom of the pan or utensil used over the burner. The flow and return pipes 2, 3 open into the water chamber 5 of the heater at different elevations, so as to produce a circulation through the same, the cold water coming into the heater through the inlet or flow pipe 2 which is beneath the horizontal plane of the return or outlet pipe 3 through which latter the heated water passes to the receptacle or reservoir 4.

This receptacle may be of any form and construction, but I preferably employ one of cylindrical shape with an open top and handles 10 at opposite points on its outside adjacent to its top.

As shown in Fig. 3, a removable cover 11 having a flat top, is preferably used to close the receptacle or boiler and confine the heat and steam therein. The top of this cover is flat so that food which is to be kept warm, may be placed upon it and covered by an inverted pan or a suitable cover. If desired, one or more shelves or trays may be supported in the upper portion of the receptacle for this purpose. As shown in Fig. 3, a single removable shelf 12 is supported upon legs 13 which rest upon the bottom of the receptacle and hold the shelf above the level of the water therein; but it will be understood that any other suitable supporting means may be provided for this purpose.

From the foregoing it will be observed that when a cooking vessel or utensil is supported upon the heating ring, the open top of the latter will be closed to form, beneath the vessel, a chamber for the diffusion of the heat, which latter cannot escape between the bottom of the vessel and the top of the ring since the upper and outer edge of said ring forms a continuous flange or rim which is in unbroken contact with the bottom of the vessel. The closed chamber thus formed holds the heat and products of combustion in contact with the entire bottom of the vessel and the entire top and bottom or inner surface of the ring. The products of combustion after circulating in said chamber escape under the bottom edge of the ring.

It will be understood that while I have shown and described the preferred embodiment of my invention, I do not wish to be limited to the precise construction herein set forth, since various changes in the form, proportion and the minor details of construction may be resorted to within the scope of the invention as defined by the appended claim.

Having thus described my invention, what I claim as new and desire to secure by Letters-Patent, is:

A heating apparatus comprising in combination a vessel, an annular boiler and pipes providing communication between said vessel and boiler, said boiler consisting of a vertical outer wall, an inner wall extending upwardly and inwardly from the lower portion of said outer wall, and a top inclined upwardly from the upper edge of the inner wall and provided with a flange adapted to fit over the upper edge of said outer wall.

In testimony whereof I affix my signature in presence of two witnesses.

ELLA H. STEELE.

Witnesses:
A. E. HAMILTON,
C. H. YEARIAN.